US010423507B1

(12) United States Patent
Panghal et al.

(10) Patent No.: US 10,423,507 B1
(45) Date of Patent: Sep. 24, 2019

(54) REPAIRING A SITE CACHE IN A DISTRIBUTED FILE SYSTEM

(71) Applicant: EMC IP Holding Company LLC, Hopkinton, MA (US)

(72) Inventors: Vijay Panghal, Santa Clara, CA (US); Kee Shen Quah, Mountain View, CA (US); Shrinand Javadekar, Sunnyvale, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 280 days.

(21) Appl. No.: 14/978,424

(22) Filed: Dec. 22, 2015

Related U.S. Application Data

(63) Continuation-in-part of application No. 14/864,425, filed on Sep. 24, 2015, now Pat. No. 9,898,477, which is a continuation-in-part of application No. 14/673,071, filed on Mar. 30, 2015.

(60) Provisional application No. 62/088,427, filed on Dec. 5, 2014.

(51) Int. Cl.
| | |
|---|---|
| *G06F 11/20* | (2006.01) |
| *H04L 29/08* | (2006.01) |
| *G06F 3/06* | (2006.01) |
| *G06F 16/172* | (2019.01) |
| *G06F 16/182* | (2019.01) |

(52) U.S. Cl.
CPC .......... *G06F 11/2069* (2013.01); *G06F 3/065* (2013.01); *G06F 3/0619* (2013.01); *G06F 3/0683* (2013.01); *G06F 16/172* (2019.01); *G06F 16/183* (2019.01); *H04L 67/1097* (2013.01); *H04L 67/2842* (2013.01); *G06F 2201/885* (2013.01)

(58) Field of Classification Search
CPC combination set(s) only.
See application file for complete search history.

(56) References Cited

U.S. PATENT DOCUMENTS

| | | | |
|---|---|---|---|
| 6,091,518 A | 7/2000 | Anabuki | |
| 6,289,345 B1 | 9/2001 | Yasue | |
| 6,324,492 B1 | 11/2001 | Rowe | |
| 6,434,608 B1 | 8/2002 | Desal et al. | |
| 6,434,609 B1 | 8/2002 | Humphrey | |
| 6,467,048 B1 * | 10/2002 | Olarig | G11C 29/70 714/54 |
| 6,658,533 B1 | 12/2003 | Bogin | |
| 6,959,339 B1 | 10/2005 | Wu | |
| 7,590,803 B2 | 9/2009 | Wintergerst | |
| 7,685,463 B1 | 3/2010 | Linnell | |
| 8,260,913 B2 | 9/2012 | Knapp | |
| 8,984,144 B2 | 3/2015 | Schapira | |

(Continued)

OTHER PUBLICATIONS

U.S. Appl. No. 14/671,740, filed Mar. 27, 2015, Rajiv Desai, et al.

(Continued)

*Primary Examiner* — Yong J Choe
(74) *Attorney, Agent, or Firm* — Workman Nydegger

(57) ABSTRACT

A failing computer readable storage medium comprising a portion of a transient object store is detected at a site cache. The site cache associated with the transient object store is set to an error read only state. The failing computer readable storage medium is replaced with an operational computer readable storage medium.

18 Claims, 11 Drawing Sheets

(56) References Cited

U.S. PATENT DOCUMENTS

| | | | |
|---|---|---|---|
| 9,280,683 | B1 | 3/2016 | Echeverria |
| 9,286,331 | B2 | 3/2016 | Knapp |
| 9,426,071 | B1 | 8/2016 | Caldejon |
| 9,898,477 | B1 | 2/2018 | Panghal |
| 10,021,212 | B1 | 7/2018 | Desai |
| 10,191,914 | B2 | 1/2019 | Manville |
| 2002/0138559 | A1 | 9/2002 | Ulrich |
| 2002/0152318 | A1 | 10/2002 | Menon |
| 2003/0005084 | A1 | 1/2003 | Humphrey |
| 2004/0064485 | A1 | 4/2004 | Yoshida |
| 2004/0255048 | A1 | 12/2004 | Lev Ran et al. |
| 2005/0246393 | A1 | 11/2005 | Coates |
| 2005/0262150 | A1 | 11/2005 | Krishnaswamy |
| 2006/0036602 | A1 | 2/2006 | Unangst |
| 2006/0080511 | A1 | 4/2006 | Hoover |
| 2006/0200623 | A1 | 9/2006 | Gonzalez |
| 2006/0277196 | A1 | 12/2006 | Oosawa |
| 2007/0094354 | A1 | 4/2007 | Soltis |
| 2007/0168542 | A1 | 7/2007 | Gupta |
| 2007/0171562 | A1* | 7/2007 | Maejima ............ G06F 11/1662 360/69 |
| 2007/0174333 | A1 | 7/2007 | Lee |
| 2007/0179981 | A1 | 8/2007 | Vincent |
| 2007/0237086 | A1 | 10/2007 | Tulac |
| 2008/0195483 | A1 | 8/2008 | Moore |
| 2009/0083494 | A1 | 3/2009 | Bhanoo |
| 2010/0042743 | A1 | 2/2010 | Jeon |
| 2010/0070982 | A1 | 3/2010 | Pitts |
| 2010/0161657 | A1 | 6/2010 | Cha |
| 2010/0293336 | A1 | 11/2010 | Shribman |
| 2010/0299447 | A1 | 11/2010 | Salvi |
| 2010/0332401 | A1 | 12/2010 | Prahiad |
| 2010/0332456 | A1 | 12/2010 | Prahiad |
| 2011/0145189 | A1 | 6/2011 | Zheng et al. |
| 2011/0258461 | A1 | 10/2011 | Bates |
| 2012/0054152 | A1* | 3/2012 | Adkins ............ G06F 17/30371 707/623 |
| 2012/0151016 | A1 | 6/2012 | Wein |
| 2012/0226770 | A1 | 9/2012 | Schapira |
| 2012/0254116 | A1 | 10/2012 | Thereska |
| 2012/0311248 | A1* | 12/2012 | Goodman ............ G06F 12/126 711/105 |
| 2013/0041872 | A1 | 2/2013 | Aizman |
| 2013/0060884 | A1 | 3/2013 | Bernbo |
| 2013/0110906 | A1 | 5/2013 | Zearing |
| 2013/0179573 | A1 | 7/2013 | McCarty |
| 2013/0226888 | A1 | 8/2013 | Govind |
| 2013/0238752 | A1 | 9/2013 | Park et al. |
| 2013/0290284 | A1 | 10/2013 | Knapp |
| 2013/0297969 | A1 | 11/2013 | Kim |
| 2014/0039818 | A1 | 2/2014 | Arya |
| 2014/0040412 | A1 | 2/2014 | Yanagihara |
| 2014/0165119 | A1 | 6/2014 | Liu |
| 2014/0189432 | A1 | 7/2014 | Gokhale |
| 2014/0304268 | A1 | 10/2014 | Gunda |
| 2014/0337484 | A1 | 11/2014 | Kasten |
| 2015/0161048 | A1 | 6/2015 | Patil et al. |
| 2015/0180968 | A1 | 6/2015 | Schapira |
| 2015/0249709 | A1 | 9/2015 | Teng et al. |
| 2015/0277802 | A1 | 10/2015 | Oikarinen |
| 2015/0280959 | A1 | 10/2015 | Vincent |
| 2015/0350106 | A1 | 12/2015 | Whalley |
| 2016/0011816 | A1 | 1/2016 | Aizman |
| 2016/0092354 | A1 | 3/2016 | Steely |
| 2016/0239397 | A1 | 8/2016 | Thomas |
| 2016/0269501 | A1 | 9/2016 | Usgaonkar |
| 2016/0292429 | A1 | 10/2016 | Manville et al. |
| 2016/0337426 | A1 | 11/2016 | Shribman |
| 2016/0357450 | A1 | 12/2016 | Rao et al. |
| 2016/0364407 | A1 | 12/2016 | Hong |
| 2017/0004082 | A1 | 1/2017 | Sehgal |

OTHER PUBLICATIONS

U.S. Appl. No. 15/199,599, filed Jun. 30, 2016, Rajiv Desai, et al.
U.S. Appl. No. 15/199,617, filed Jun. 30, 2016, Rajiv Desai, et al.
U.S. Appl. No. 15/199,624, filed Jun. 30, 2016, Rajiv Desai, et al.
U.S. Appl. No. 14/671,675, filed Mar. 27, 2015, Rajiv Desai.
U.S. Appl. No. 14/673,071, filed Mar. 30, 2015, Rajiv Desai, et al.
U.S. Appl. No. 14/865,333, filed Sep. 25, 2015, Vijay Panghal, et al.
U.S. Appl. No. 14/864,399, filed Sep. 24, 2015, Vijay Panghal.
U.S. Appl. No. 14/864,425, filed Sep. 24, 2015, Vijay Panghal.
U.S. Appl. No. 14/978,480, filed Dec. 22, 2015, Vijay Panghal, et al.
U.S. Appl. No. 14/978,520, filed Dec. 22, 2015, Vijay Panghal, et al.
U.S. Appl. No. 14/671,675, Dec. 14, 2016, Office Action.
U.S. Appl. No. 14/865,333, Dec. 16, 2016, Office Action.
U.S. Appl. No. 14/864,425, Dec. 29, 2016, Office Action.
U.S. Appl. No. 14/864,399, Feb. 1, 2017, Office Action.
U.S. Appl. No. 14/978,520, Mar. 13, 2017, Office Action.
U.S. Appl. No. 14/978,480, Apr. 5, 2018, Office Action.
U.S. Appl. No. 14/865,333, Feb. 27, 2018, Final Office Action.
U.S. Appl. No. 14/671,675, Mar. 13, 2018, Notice of Allowance.
U.S. Appl. No. 15/388,805, filed Dec. 22, 2016, Shrinand Javadekar, et al.
U.S. Appl. No. 14/671,675, Jun. 6, 2017, Final Office Action.
U.S. Appl. No. 14/671,675, Oct. 6, 2017, Final Office Action.
U.S. Appl. No. 14/671,740, Jul. 12, 2017, Office Action.
U.S. Appl. No. 14/671,740, Dec. 6, 2017, Final Office Action.
U.S. Appl. No. 14/673,071, May 8, 2017, Office Action.
U.S. Appl. No. 14/673,071, Oct. 31, 2017, Final Office Action.
U.S. Appl. No. 14/864,399, Jun. 15, 2017, Final Office Action.
U.S. Appl. No. 14/864,399, Jan. 10, 2018, Office Action.
U.S. Appl. No. 14/864,425, Jun. 22, 2017, Final Office Action.
U.S. Appl. No. 14/864,425, Oct. 11, 2017, Notice of Allowance.
U.S. Appl. No. 14/865,333, Jun. 1, 2017, Final Office Action.
U.S. Appl. No. 14/865,333, Aug. 25, 2017, Office Action.
U.S. Appl. No. 14/978,480, Jun. 23, 2017, Office Action.
U.S. Appl. No. 14/978,480, Dec. 5, 2017, Final Office Action.
U.S. Appl. No. 14/978/520, Mar. 13, 2017, Final Office Action.
U.S. Appl. No. 14/978,520, Sep. 20, 2017, Final Office Action.
U.S. Appl. No. 14/978,520, Jan. 4, 2018, Office Action.
U.S. Appl. No. 16/031,775, filed Jul. 10, 2018, Rajiv Desai.
U.S. Appl. No. 16/031,775, Aug. 27, 2018, Office Action.
U.S. Appl. No. 15/199,617, Sep. 17, 2018, Office Action.
U.S. Appl. No. 15/199,624, Sep. 5, 2018, Office Action.
U.S. Appl. No. 14/864,399, Jul. 17, 2018, Final Office Action.
U.S. Appl. No. 14/865,333, Jul. 25, 2018, Office Action.
U.S. Appl. No. 14/671,740, Oct. 12, 2018, Office Action.
U.S. Appl. No. 15/199,599, Oct. 5, 2018, Office Action.
U.S. Appl. No. 14/978,520, Sep. 18, 2018, Final Office Action.
U.S. Appl. No. 14/673,071, Sep. 19, 2018, Office Action.
U.S. Appl. No. 15/388,805, Oct. 31, 2018, Office Action.
U.S. Appl. No. 14/978,480, Nov. 27, 2018, Final Office Action.
U.S. Appl. No. 14/865,333, Nov. 29, 2018, Final Office Action.
U.S. Appl. No. 14/864,399, Dec. 13, 2018, Office Action.
U.S. Appl. No. 14/978,520, Jan. 11, 2019, Office Action.
U.S. Appl. No. 15/199,617, Feb. 4, 2019, Final Office Action.
U.S. Appl. No. 15/199,624, Feb. 6, 2019, Final Office Action.
U.S. Appl. No. 16/031,775, Mar. 26, 2019, Notice of Allowance.
U.S. Appl. No. 14/865,333, Mar. 29, 2019, Office Action.
U.S. Appl. No. 14/978,480, Apr. 22, 2019, Office Action.
U.S. Appl. No. 15/388,805, Apr. 4, 2019, Final Office Action.
U.S. Appl. No. 14/673,071, May 9, 2019, Notice of Allowance.
U.S. Appl. No. 15/199,599, dated May 21, 2019, Notice of Allowance.
U.S. Appl. No. 14/864,399, dated Jul. 22, 2019, Notice of Allowance.
U.S. Appl. No. 15/199,624, dated Jul. 22, 2019, Office Action.
U.S. Appl. No. 15/388,805, dated Jul. 25, 2019, Office Action.
U.S. Appl. No. 14/978,520, dated Jul. 30, 2019, Notice of Allowance.

* cited by examiner

REPAIRING A SITE CACHE IN A DISTRIBUTED FILE SYSTEM

CROSS REFERENCE TO RELATED APPLICATIONS

This application claims priority and is a continuation in part of co-pending U.S. patent application Ser. No. 14/864,425, filed Sep. 24, 2015, which is incorporated herein by reference for all purposes.

FIELD OF THE INVENTION

This invention relates generally to distributed file systems, and more particularly to systems and methods for reading data objects on a site cache associated with the distributed file system.

BACKGROUND OF THE INVENTION

Distributed file systems manage files and folders spread across multiple computers. They may serve a similar function as traditional file systems, but are designed to provide file/folder storage and controlled access over local and wide area networks. Some individuals and/or enterprises may rely on distributed file systems to manage their personal and/or organizational data.

There is a need, therefore, for an improved method, article of manufacture, and apparatus for accessing a distributed file system.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
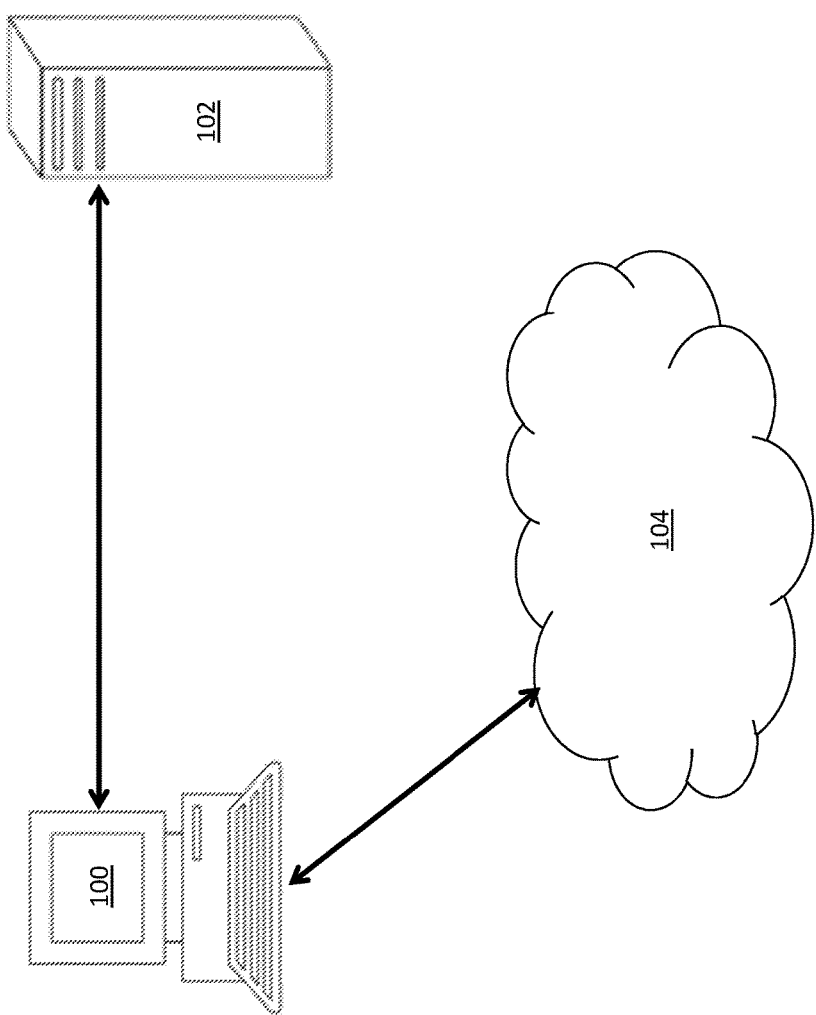
FIG. 1 depicts a system architecture for a distributed file system in a cloud environment consistent with an embodiment of the present disclosure

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Embodiments of the present disclosure provide a site cache for processing IO requests on a distributed file system. Distributed files systems may be used to manage files, folders, and other data spread across multiple computing systems. They may be presented to users, applications, or other clients as traditional file systems, but may actually provide access to data over local and wide area networks. For example, the data could be stored in a cloud based object stores, such as Amazon S3, Microsoft Azure, Google Drive, a private object store, and/or a hybrid object store. Access to the data on these object stores may be managed by a metadata server, which could be a local or remote server from the client.

While cloud based object stores may create the appearance of a single object store, the data may actually be physically stored across multiple datacenters that are geographically diverse. For example, portions of data may be stored at data centers in both California and Arizona, while still being part of the same logical object store. Clients that are not physically located near an object store may experience a negative performance impact when issuing IO requests to that store. For example, it may take longer for a client in New York to write data to an object store located in California than it would if the object store were located at the client's site. The present disclosure provides a site cache to compensate for this performance degradation.

An embodiment of the present disclosure provides a site cache at client sites. For example, if clients are spread across multiple branch offices, each branch may have its own site cache. Access to the site cache may be provided to each client over a high bandwidth, low latency connection. This may be contrasted with a lower bandwidth, higher latency connection to an authoritative object store, such as a public cloud. Clients may issue IO requests to the site cache via a metadata server, and the site cache may service those requests if it is able. This allows the clients to realize the performance benefits of a local object store, while still being able to access a geographically diverse distributed file system.

Site caches, however, may be prone to hardware failures similar to other computer systems. For example, a site cache may include one or more storage devices, such as hard drives or solid state drives, for storing objects subject to a client's IO requests. In some instances, these objects may exist solely in the site cache and no where else. For example, the objects may exist in the site cache but not in an authoritative cloud based object store. If a storage device on the site cache fails, such as the result of a hardware failure, there is a risk that the data objects in that cache will be lost. The present disclosure enables failing storage devices in a site cache to be swapped, thereby limiting or preventing data loss.

FIG. 1 depicts a system implementing a distributed file system in a cloud environment. The system of FIG. 1 may include client 100, metadata server ("MDS") 102, and object store 104. While only one client 100 is shown, the system may include multiple clients accessing the distributed file system. Similarly, the system may include multiple object stores 104 and/or multiple MDS 102.

Client 100 may be any general purpose computing device. For example, client 100 may be a personal computer, workstation, handheld computer, smart phone, and/or tablet computer. Additionally or alternatively, client 100 may be a software module or application running on a general purpose computing device. Client 100 may be in communication with a MDS 102 and object store 104 over a network connection, such as a local area network ("LAN") or wide area network ("WAN"), or via any other form of communication. Client computer 100 may interact with the distributed file system as it would with a traditional file system, such as by writing data to and reading data from the distributed file system.

MDS 102 may be a general purpose computing device managing distributed file system metadata. This metadata could include, for example, the location of data stored in the distributed file system. MDS 102 may be a physical or a virtual machine, and may operate in an environment local to or remote from client 100. For example, MDS 102 may be a virtual machine operating in the same datacenter as client 100. Additionally or alternatively, MDS 102 may operate in a third party cloud environment, such as Amazon Web Services ("AWS"). In some embodiments, MDS 102 may operate in the same third party cloud environment as object store 104.

Object store 104 may comprise a storage location for storing data in the distributed file system. Object store 104 may be a private, public, or hybrid cloud environment capable of storing data. A private cloud may be an object store only available to clients belonging to a particular enterprise. For example, a private cloud may be an OpenStack Swift instance operating in a datacenter completely under the control of an enterprise. The install, including the associated data and services, may not be accessible to anyone outside of the enterprise. A public cloud may be any object store accessible to the public that requires authentication to access certain data. For example, Amazon S3 is available to members of the public but data stored in the object store is only accessible by authorized clients. A hybrid cloud may be a combination of a private and public cloud, such that some data is stored in the private cloud and other data is stored in the public cloud.

In some embodiments, client 100 may transmit communications to and receive responses from MDS 102. Similarly, client 100 may transmit communications to and receive responses from object store 104. Typically these communications will be IO requests and responses, such as read/write communications, though any other type of communication is consistent with the present disclosure.

For example, client 100 may decide to read data from the distributed file system. Client 100 may first mount the distributed file system by transmitting a mount request and/or intent to MDS 102. Similarly, if the distributed file system has already been mounted, client 100 may transmit a change location/directory request to MDS 102. In response, MDS 102 may consult a metadata table to determine data objects located at the root of the mount or in the new location, and transmit information related to the data back to client 100. This data could be, for example, a list of files and/or directories located at the root or new location. The data may also include a unique identifier for each data object, such as a hash and/or path of the object.

Once client 100 has a list of files and/or directories, client 100 may select a data object to read. Client 100 may transmit a read request identifying the desired data object back to MDS 102. In some embodiments, this read request may include a path or hash identifier for the data object the client desires. Once MDS 102 receives the request, it may attempt to locate the data object on the distributed file system.

In an embodiment, MDS 102 maintains location data for all of the data objects in the distributed file system. This location data may be maintained with other data object metadata in a database on MDS 102. For example, the database may comprise a table mapping a data object to one or more object store locations. These object store locations could reside, for example, on object store 104.

In response to the read request received from client 100, MDS 102 may consult the database table to determine the object location. MDS 102 may then return the object location back to client 100. In an embodiment, the object location returned might be a URL the client may use to access all or part of the data object. For example, the URL may comprise "http://<object store domain>/<container identifier>/<object identifier>", where <object store domain> is the domain of the object store, <container identifier> is an identifier for the distributed file system and/or a container on the object store used by the distributed file system, and <object identifier> identifies the object to be read. In an embodiment, the object identifier is a hash of the object and/or a hash of a version of the object.

Client 100 may attempt to access the data object once it receives the data object location from MDS 102. If the data object location is a URL, the client may issue an HTTP GET to the URL. For example, the client may issue a GET to object store 104 and/or the cloud service provider holding the data object. In response, object store 104 may return the requested data object to client 100.

The present system may also be used to write data objects to the distributed file system. This process may be similar to reading data objects, as discussed above. Once the distributed file system is mounted and client 100 has identified the file system location where it wishes to write the data, client 100 may transmit a write intent to MDS 102. This write intent may include the identified file system location and an object identifier for the data object client 100 intends to write. In some embodiments, this object identifier may be a hash of the data object or a hash of a version of the data object.

Upon receiving the intent, MDS 102 may consult a database table to determine if the data object has already been placed in an object store, such as object store 104. If the data object already exists, there is no need to write it to the object store a second time. MDS 102 may perform this check by comparing the provided object identifier to all of the object identifiers in the table. If there is a match, the data object exists. If there is not a match, the data object does not exist.

If the data object already exists in object store 104, client 100 may not need to transmit the data object to the store a second time. Instead, MDS 102 may create a new entry in the table comprising the object identifier and the location client 100 wishes to write the data. MDS 102 may then transmit a write complete notification to client 100, and the write process may terminate. Should client 100 issue a subsequent read for the object, MDS 102 may provide a URL to the data object on object 104 as discussed above. This process provides an inherent form of data deduplication by ensuring a data object is not written to the same object store multiple times.

If MDS 102 determines object store 104 does not have a copy of the data object (i.e. the object identifier is not found in the table), it may create a new entry for the object as discussed above. MDS 102 may additionally provide an object location back to client 100, and associate this object location with the new table entry. In some embodiments the object location is a URL constructed in the same manner as the URL generated during the read process.

Once client 100 receives the object location it may write the data object to that location. If the object location is a URL identifying an object store, such as object store 104, client 100 may write the data to that location using an HTTP POST and/or PUT. The POST and/or PUT request may include the data object client 100 wishes to store on object store 104. In some embodiments client 100 may conclude that the write was successful after the post was sent and terminate the write process. Alternatively, client 100 may wait for a confirmation from object store 104 before determining the write was successful.

While the above examples discuss reading and writing data objects as individuals, other configurations may exist. For example, individual data objects may be broken into a set of data chunks. Each of these data chunks may be stored and accessed on the object store in the same manner as the individual data objects discussed above. When a client wishes to read a data object, the client may submit identifiers for all the data object's constituent chunks to the MDS and receive a URL for each. Similarly, for writes the client may submit identifiers for all the data object's constituent chunks to the MDS. In response, the MDS may only provide write URLs for the chunks that do not already exist on the object store. If the chunks already exist the MDS may simply update the metadata table; there is no need to write the chunks a second time.

Figure 2:
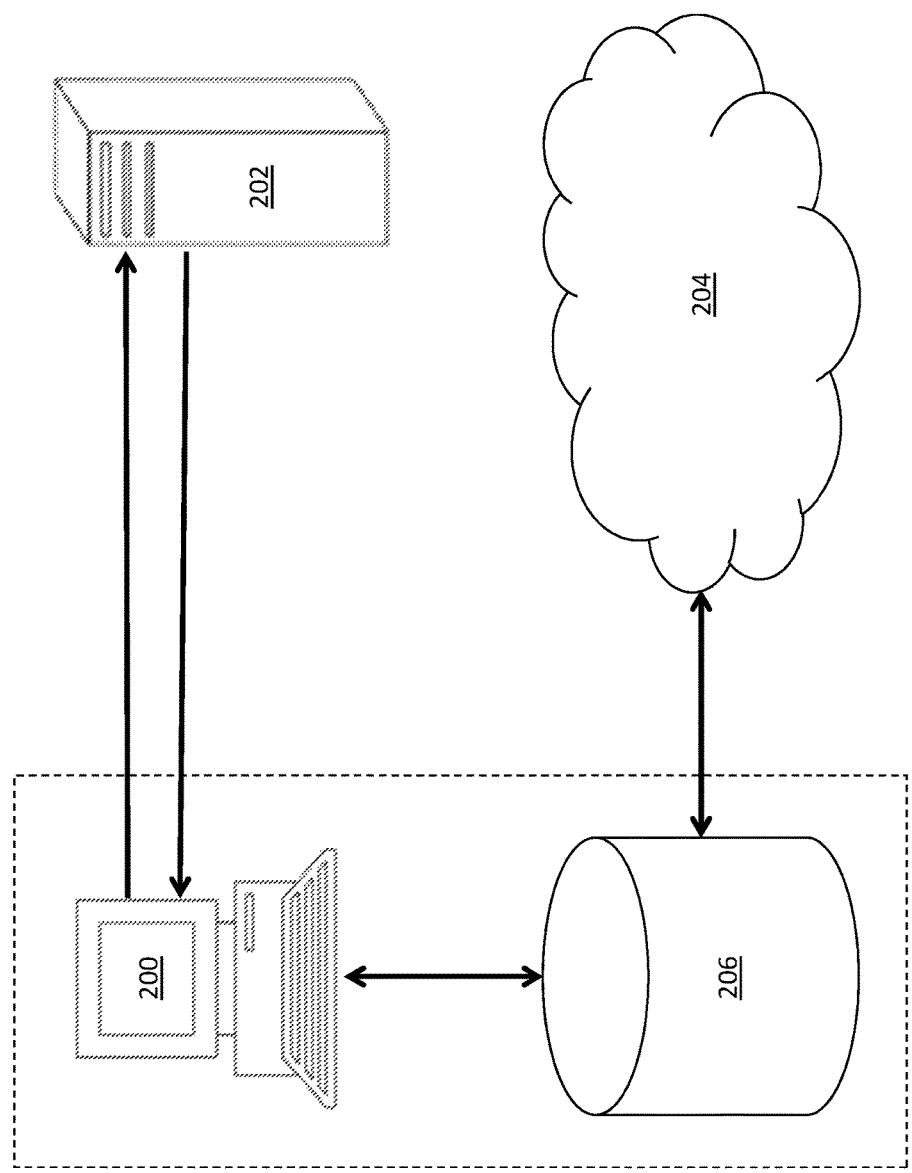
FIG. 2 depicts a system architecture for a distributed file system using a site cache consistent with an embodiment of the present disclosure.

Turning now to FIG. 2, a system providing a distributed file system using a site cache is discussed. FIG. 2 may comprise client 200, MDS 202, and object store 204. In some embodiments, client 200 may be similar to client 100, MDS 202 may be similar to MDS 102, and authoritative object store 204 may be similar to object store 104. FIG. 2 may also include site cache 206, which may be physically located at or near client 200 as showed by the dashed box. While not shown, the system of FIG. 2 may include a plurality of locations, and some locations may have a site cache while other locations do not. While MDS 202 is shown at a separate location in FIG. 2, an embodiment of the disclosure may have MDS physically located at or near client 200 and/or site cache's 206 location.

Site cache 206 may comprise a transient object store capable of storing data object and/or data segments. In an embodiment, the transient object store is similar to the authoritative object store. For example, the transient object store may be a local cloud storage install, such as a local OpenStack Swift install, while the authoritative object store may be a public cloud storage, such as a hosted Microsoft Azure instance. The transient object store may be capable of storing data and responding to read and/or write requests in the same manner as object store 104 discussed in reference to FIG. 1.

In some embodiments, client 200 may be in communication with site cache 206 over a high bandwidth, low latency connection. While not shown, client 200 may also be in communication with authoritative object store 204 over a lower bandwidth, higher latency connection. When possible, client 200 may prefer to have IO requests processed by site cache 206 to take advantage of the superior connectivity.

Site cache 206 may improve the distribute file system's performance by processing read and/or write requests when able. In some embodiments, the site cache may by physically located near a client, such as in the client's geographical branch office. When the client issues a read request for a data object, the site cache may first process the request. If the cache contains the object, it may be returned to the client via the site cache's superior connectivity. If the site cache does not contain the data object, the read request may be forwarded to authoritative object store 204. Similarly, a client may prefer to issue write requests to the site cache. The data objects associated with the write request may be stored in the site cache's transient object store and periodically evicted and/or flushed to authoritative object store 204.

Figure 3:
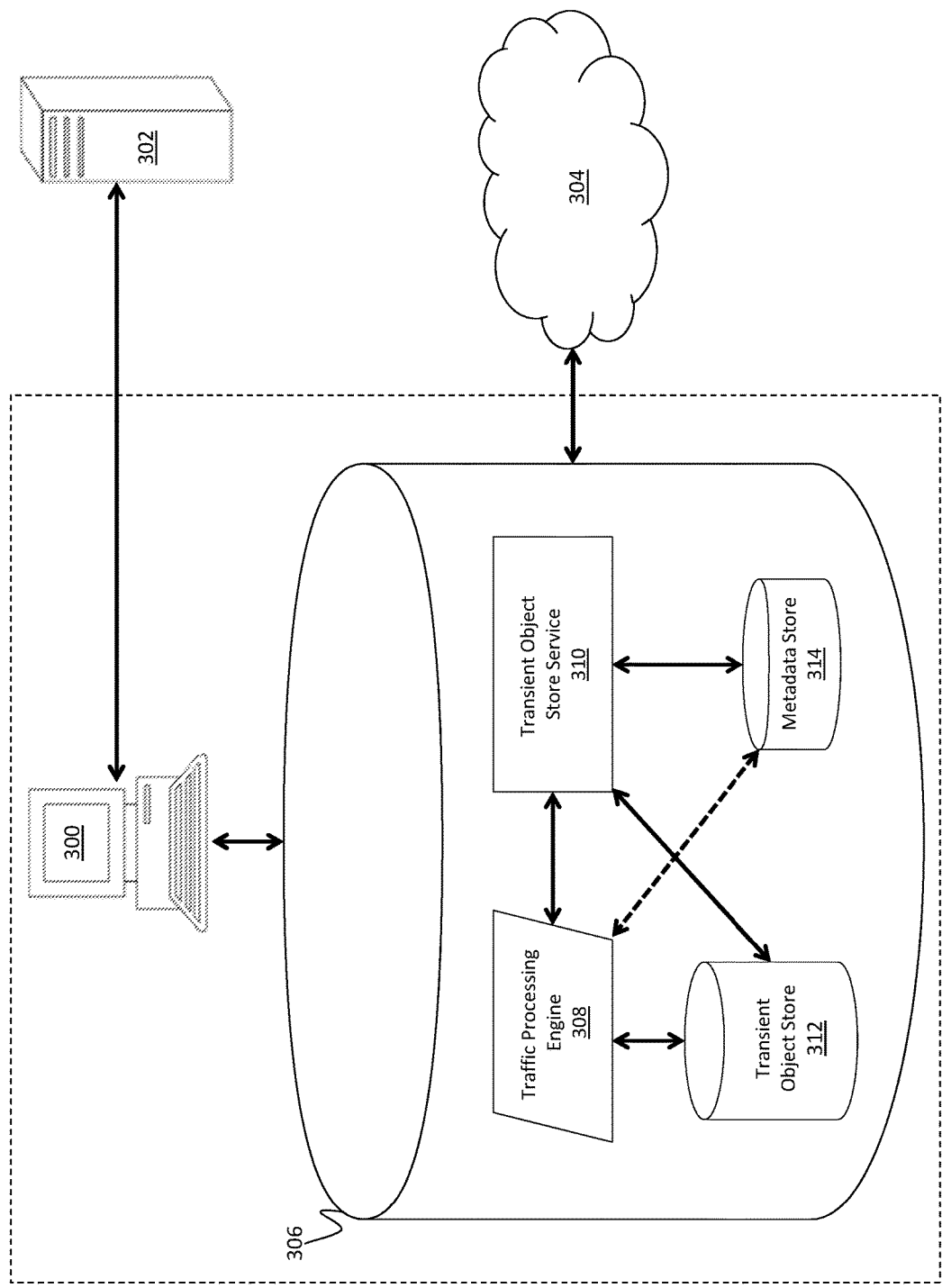
FIG. 3 depicts a detailed site cache architecture consistent with an embodiment of the present disclosure.

FIG. 3 depicts a site cache architecture consistent with an embodiment of the present disclosure. In an embodiment, all read and/or write requests made by a client may be processed by site cache 306. For example, MDS 302 may return two URLs in response to a client's 300 read and/or write request. One URL may be for site cache 306 and the other URL may be fore authoritative object store 304. The client may then communicate the request to site cache 306 which may either process the request locally or forward it to authoritative object store 304.

The system shown in FIG. 3 includes client 300, MDS 302, and authoritative object store 304. These components may behave similar to like named elements discussed above. FIG. 3 also shows site cache 306, which may process read and/or write requests from client 300. In some embodiments, site cache 306 may be substantially similar to site cache 206.

Site cache 306 may include traffic processing engine 308. In some embodiments, traffic processing engine 308 may be the gateway into site cache 306. When client 300 issues a read and/or a write request, traffic processing engine 308 may receive the request and determine an appropriate response. For example, traffic processing engine 308 may communicate with other site cache components to service the request. Additionally or alternatively, traffic processing engine 308 may forward the request to authoritative object store 304. These scenarios are discussed in further detail below. In some embodiments, traffic processing engine 308 is an HTTP proxy, such as NGINX.

Site cache 306 may also include transient object store service 310. Transient object store service 310 may comprise a software service, application, module, or plugin containing logic for managing site cache 306. For example, transient object store service 310 may monitor the capacity of transient object store 312, manage evictions and/or flushing policies, and/or maintain the site cache state. Transient object store service may also be in communication with metadata store 314, and may be used to determine whether site cache 306 contains a copy of a requested data object.

Site cache 306 may further include transient object store 312, which may be substantially similar to authoritative object store 304. In an embodiment, transient object store 312 may be used to store data objects. Storing these data objects in transient object store 312 may improve the distributed file system's performance as it allows the site cache to quickly service read and/or write requests from client 300 over a high bandwidth, low latency communication. In some embodiments, transient object store 312 comprises an OpenStack Swift instance.

Finally, site cache 306 may contain metadata store 314. Metadata store 314 may include metadata information about the data objects stored in transient object store 312. In an embodiment, metadata store 314 may be substantially similar to MDS 302 and contain similar information. Additionally or alternatively, metadata store may include more limited data, such as the data object identifier and data object size of the data objects stored in the transient object store. In an embodiment, the transient object store service may be used to determine whether a data object exists in the site cache. In some embodiments, the metadata store 314 is a relational database, such as MySQL.

Figure 4:
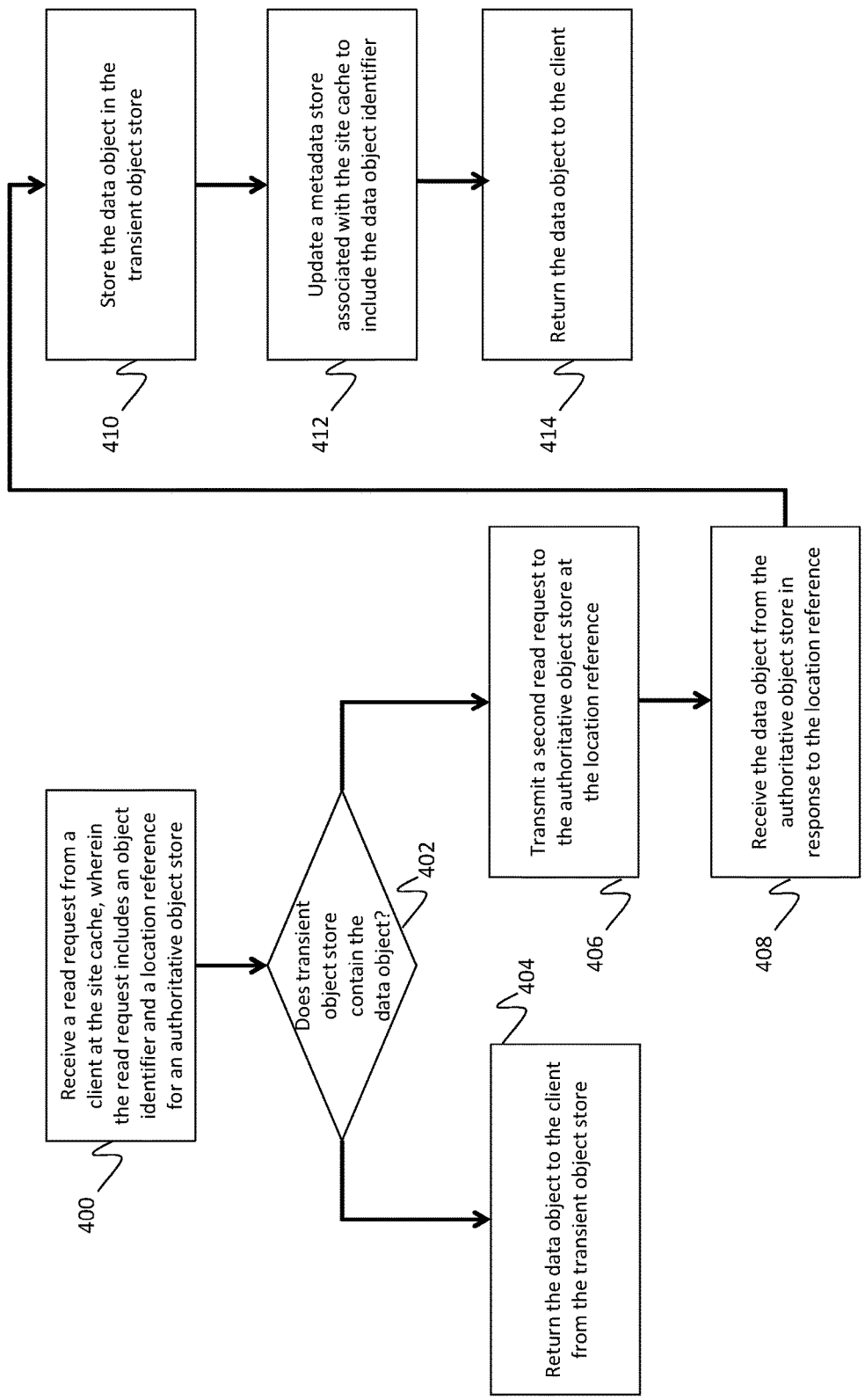
FIG. 4 depicts a process for reading from a site cache consistent with an embodiment of the present disclosure.

Turning now to FIG. 4, a process for handling a read request for a data object in a distributed file system using a site cache is discussed. The process of FIG. 4 contemplates that a client, such as client 300, has already issued a read request to a metadata server and received a response. The response may include two URLs: one for the site cache and one for an authoritative object store. In some embodiments, the site cache may always attempt to service the read request before transmitting it to the authoritative object store.

At block 400, a transient object store may receive a read request from a client. The read request may include an identifier associated with a data object the client is attempting to read. In some embodiments, the read request may also include a location reference for an authoritative object store. This location reference could be, for example, a URL associated with the authoritative object store. In some embodiments, the request may be received by a traffic processing engine in the site cache, such as traffic processing engine 308.

At 402, a check is made to determine whether the site cache contains a copy of the requested data object. The data object could be stored, for example, in a transient object store such as transient object store 312. The check may be performed in at least two ways. First, the traffic processing engine may transmit the data object identifier to a transient object store service, such as transient object store service 310. The transient object store service may then query a metadata store, such as metadata store 314, to determine whether the transient object store contains a copy of the data object. If the transient object store contains the data object, the metadata store may contain the data object's identifier. Second, the traffic processing engine may contain logic for querying the metadata store directly. This may make the transient object store service unnecessary.

If the check at 402 is positive, and the transient object store does contain the requested data object, the process may continue to block 404. At block 404 the data object may be returned to the client, either directly or via the traffic processing engine, and the process may terminate. If the check at 402 is negative, and the transient object store does not contain the data object, the process may continue to block 406.

At block 406, the site cache and/or its associated transient object store may not contain the data object. As a result, the object may need to be retrieved from the authoritative object store to service the client's request. The traffic processing engine may forward the client's request to the authoritative object store using the location reference. For example, the traffic processing engine may issue and HTTP GET to the location reference to retrieve the data object.

At block 408, the data object may be received from the authoritative object store in response to the second request. The object could be received, for example, by the site cache's traffic processing engine.

At block 410, the site cache may attempt to store the received data object in the transient object store. This may be beneficial if future requests are for the same data object. In such an embodiment, the data object may be served to the requesting client from the site cache rather than from the authoritative object store. Storing the data object to the transient object store may be substantially similar to the write process discussed in reference to FIG. 5. If the transient object store is in a READ_ONLY state or otherwise incapable of processing the write, the process may continue straight to block 414.

At block 412, the metadata store may be updated in response to storing the data object in the transient object store. This may include storing the data object's identifier, size, and/or other metadata in the metadata store. In some embodiments, this update may be performed by the transient object store service.

Finally, at block 414 the data object may be returned to the client. In some embodiments, the data object may be returned to the client before or in parallel with storing it to the transient object store. The data object could be returned, for example, through the traffic processing engine.

Figure 5:
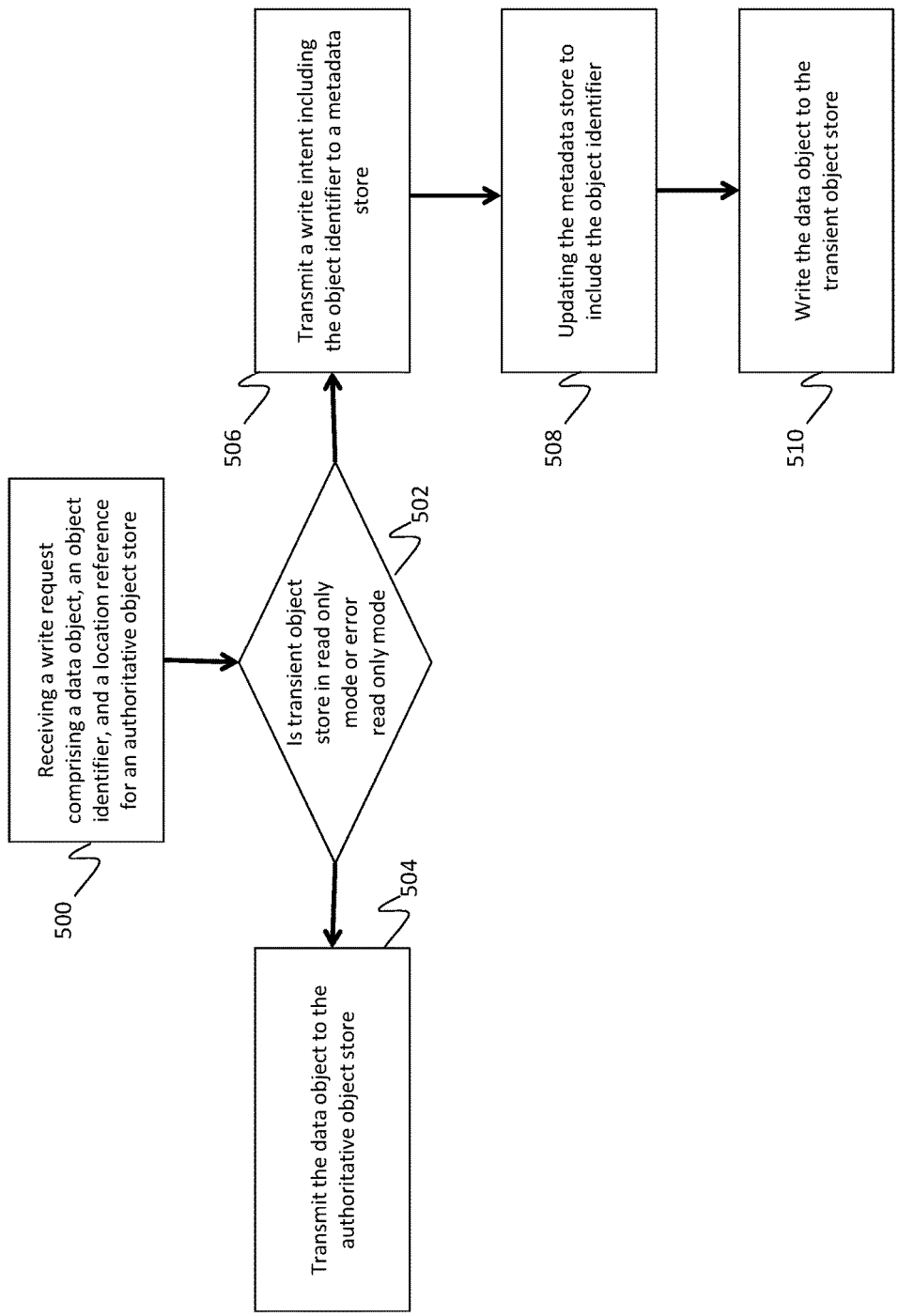
FIG. 5 depicts a process for writing to a site cache consistent with an embodiment of the present disclosure.

Turning now to FIG. 5, a process for writing a data object to a distribute file system using a site cache is discussed. At block 500, a write request may be received from a client. The write request may include a data object to write, an object identifier, and a location reference, such as a URL, for an authoritative object store. In an embodiment, the write request is received at a traffic processing engine, such as traffic processing engine 308. Additionally or alternatively, the data object may be received from the authoritative object store during a read request, as discussed in reference to FIG. 4. In such an embodiment the request may not include the location reference and/or object identifier, but may only include the data object itself.

At block 502, a check may determine whether the transient object store is in a READ_ONLY state. This may occur, for example, if the volume of a transient object store has exceeded a defined threshold, as discussed in reference to FIG. 6. If the transient object store is in a READ_ONLY state the site cache will be unable to store the data object. In an embodiment, this check is performed by a transient object store service, such as transient object store service 310.

Block 502 may also check if the site cache and/or transient object store is in an ERROR_READ_ONLY state. An ERROR_READ_ONLY state may occur when the site cache and/or transient object store is experiencing a system error, such as a failing storage medium. In some embodiments, an ERROR_READ_ONLY state is universal and supersedes all other device states. ERROR_READ_ONLY states are discussed in further detail in reference to FIG. 9.

If the transient object store is in a READ_ONLY or an ERROR_READ_ONLY state, the process may continue to block 504. At block 504 the data object may be transmitted to an authoritative object store. In some embodiments, the data object is communicated using an HTTP PUT and/or POST request. For example, a traffic processing engine may transmit the data object to the authoritative object store in response to receiving an indication from the transient object store service that the transient object store is in a READ_ONLY state. After the data object is transmitted to the authoritative object store, the traffic processing engine may receive a response indicating the write was successful. The traffic processing engine may thereafter transmit the response to the client and/or a MDS to update the data object's location information.

If the transient object store is not in a READ_ONLY state, or is in a READ_WRITE state, the process may continue to block 506. At block 506, a write intent may be communicated to a metadata store. This write intent may be sent by the transient object store service. Additionally or alternatively, the intent may be communicated directly to the metadata store from the traffic processing engine. In some embodiments, the write intent includes the data object identifier, size, and/or other data object metadata.

At block 508, the metadata store may be updated to include at least the data object identifier. This may enable the site cache to quickly determine whether it contains a data object during a read operation.

Finally, at block 510, the data object may be written to the transient object store. This may include, for example, issuing an HTTP PUT or POST request containing the data object from the traffic processing engine to the transient object store. Once the data object is written to the transient object store, a success transmission may be communicated from the traffic processing engine to the client and/or the metadata server.

Figure 6:
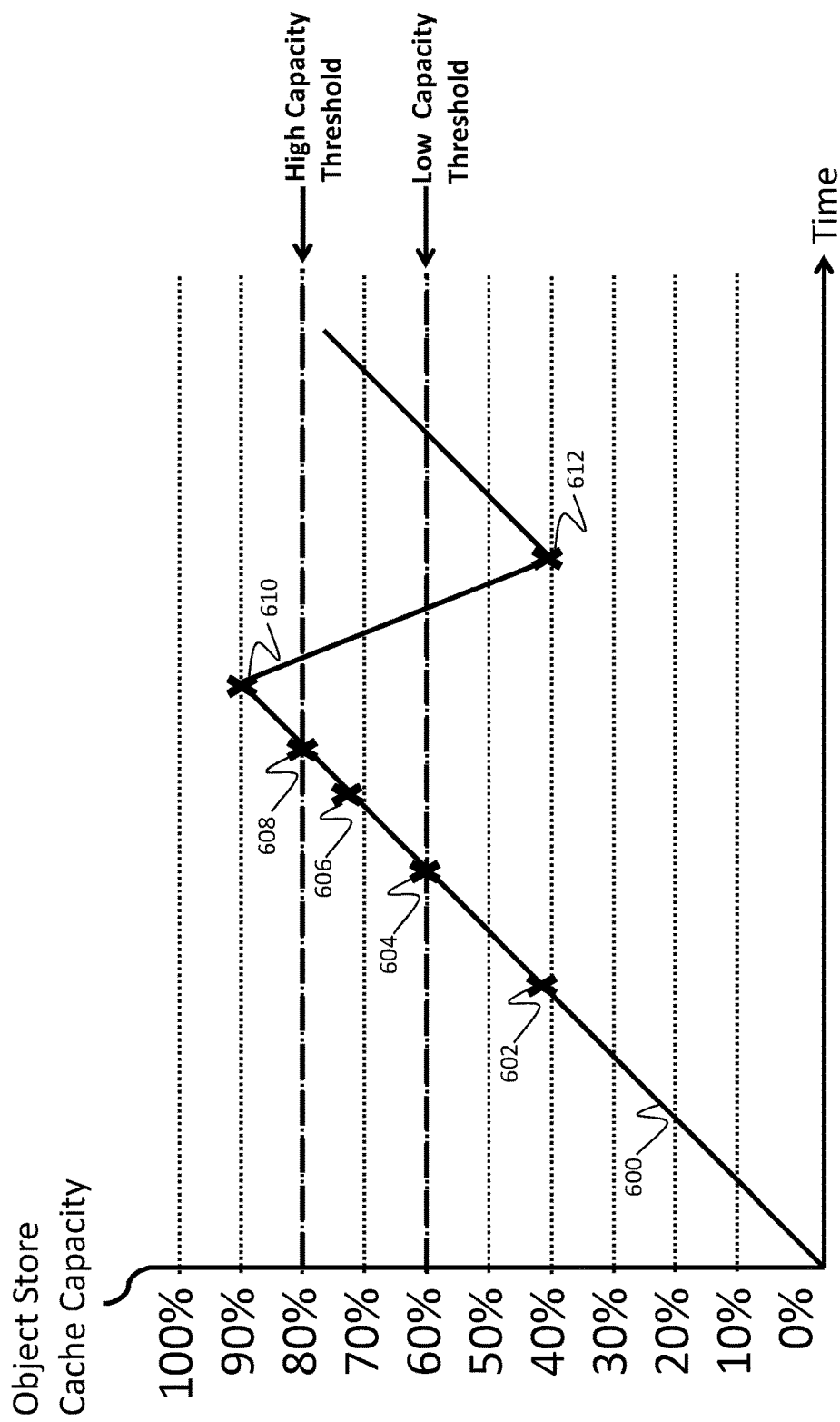
FIG. 6 depicts a varying site cache volume consistent with an embodiment of the present disclosure.

FIG. 6 depicts the site cache's volume as it varies based on an eviction policy and/or process. Transient object stores, such as transient object store 206, may have a limited capacity. For example, the transient object store may have limited disk and/or solid-state storage space. As the data volume in the transient object store reaches the store's capacity, it may be beneficial to evict data objects to the authoritative object store. Evicting a data object could mean it is stored on the authoritative object store and removed from the site cache. This may enable, for example, less used or accessed data objects in the transient object store to be replaced by newer and/or higher value objects. This eviction process may be managed by a transient object store service, which could change the state of the site cache and/or transient object store. In an embodiment, the transient object store service and/or an administrator may set or dynamically generate policies for the eviction process in addition to managing the data objects in the transient object store.

The example depicted in FIG. 6 shows the volume of data stored in the transient object store as it varies based on eviction policies. The y-axis of the graph depicts the transient object store's capacity, and the x-axis represents time. Curve 600 represents the volume of stored data on a site cache's transient object store over time as data objects are being ingested or evicted by the site cache. For example, at mark 602 the volume of data in the transient object store is consuming ~40% of the store's total capacity.

FIG. 6 further depicts both a high capacity threshold and low capacity threshold. These thresholds may be defined using the transient object store service, and may be used by the eviction process to assign and/or determine different transient object store states. For example, if the volume of data in the transient object store exceeds the high capacity threshold, it may be beneficial to prevent the ingestion of new data objects by setting the transient object store state to READ_ONLY. Similarly, while the volume is below the low capacity threshold, the transient object store state may be READ_WRITE thereby enabling clients to realize the site cache benefits for both data object reads and data object writes. These states and thresholds are described in further detail with reference to positions 602, 604, 606, 608, 610, and 612.

Position 602 on curve 600 represents when the volume of stored data in the site cache is below the low capacity threshold. This may occur, for example, when the site cache is first brought online. While below the low capacity threshold, the transient object store may have sufficient capacity to store new data objects received from a client and/or authoritative object store, and the transient object store's state may therefore be READ_WRITE. The READ_WRITE state allows the site cache to serve either read or write requests from a client.

Moving along curve 600, position 604 represents a later point in time when the low capacity threshold is reached and/or exceeded. At this point the transient object store may have sufficient remaining capacity to service new write requests, but the transient object store service may nevertheless initiate an eviction process. Initiating the eviction process upon reaching a low capacity threshold prevent the volume of stored data from reaching a point where the site cache can no longer service write requests. For example, if the volume of data evicted is larger than the volume ingested, the curve may move in a downward direction. This is unlike the example of FIG. 6, where the volume of data continues to rise despite the fact that objects are being evicted.

In some embodiments, the eviction process may be based on the transient object stores service's cache eviction policy. This policy may be determined by an administrator or dynamically generated by the transient object store service. For example, the cache eviction policy could be First in First out ("FIFO"), meaning the first data object stored in the site cache is the first transmitted to the authoritative object store, Least Recently Used/Accessed ("LRU"), meaning the last data object used or accessed in the transient object store is the first evicted to the authoritative object store, Largest out First ("LOF") policy, meaning the largest data objects are evicted first, and/or any combination of the above. In some embodiments, metadata about the data objects is stored in a metadata store, such as metadata store 314, and may be queried by the transient object store service to enforce the eviction policy. For example, the metadata store may include a timestamp and/or data object size for each data object in the transient object store.

Continuing along curve 600 from position 604, the transient object store continues to store new data objects. At position 606 the volume of stored data has exceeded the low capacity threshold, but still has not reached the high capacity threshold. The transient object store service will continue to evict stored data objects while permitting the ingestion of new data objects.

Position 608 on curve 600 represents a point at which the high capacity threshold is reached. At this point the volume of data objects being ingested by the site cache may be larger than the volume being evicted. As a result, the transient object store may be in danger of reaching maximum capacity and being unable to service new data objects. At this point, the transient object store service may set the site cache to a READ_ONLY state. While in the READ_ONLY state the transient object store service will continue to evict stored data objects, but will not permit new data objects to be written. If the new objects are received from a client, they will be passed through to the authoritative object store. If the new objects are received from an authoritative object store, they will be passed through to the client without caching a local copy. While the READ_ONLY state may prevent new data objects from being written, the site cache is still able to service read requests. As a result, a client may still realize the benefits of the site cache when attempting to read data objects (assuming the transient object store contains a copy of the data object).

Position 610 on curve 600 represents a peak in the volume. At this point, the eviction process starts decreasing the volume of stored data on the site cache. This peak could be reached, for example, if a large data object was written immediately before crossing the high capacity threshold. At this stage the site cache may still be in a READ_WRITE state servicing write requests. Once the data object is written and/or the threshold is exceeded the state will switch to READ_ONLY. The site cache will remain in READ_ONLY state until the volume of stored data falls below the low capacity threshold.

Moving further along curve 600, position 612 represents a point where the eviction process has brought the volume of stored data below the low capacity threshold. At this point the transient object store may have sufficient capacity to again begin servicing write requests. The transient object store service will set the site cache back to a READ_WRITE state and allow ingestion of new data objects.

Figure 7:
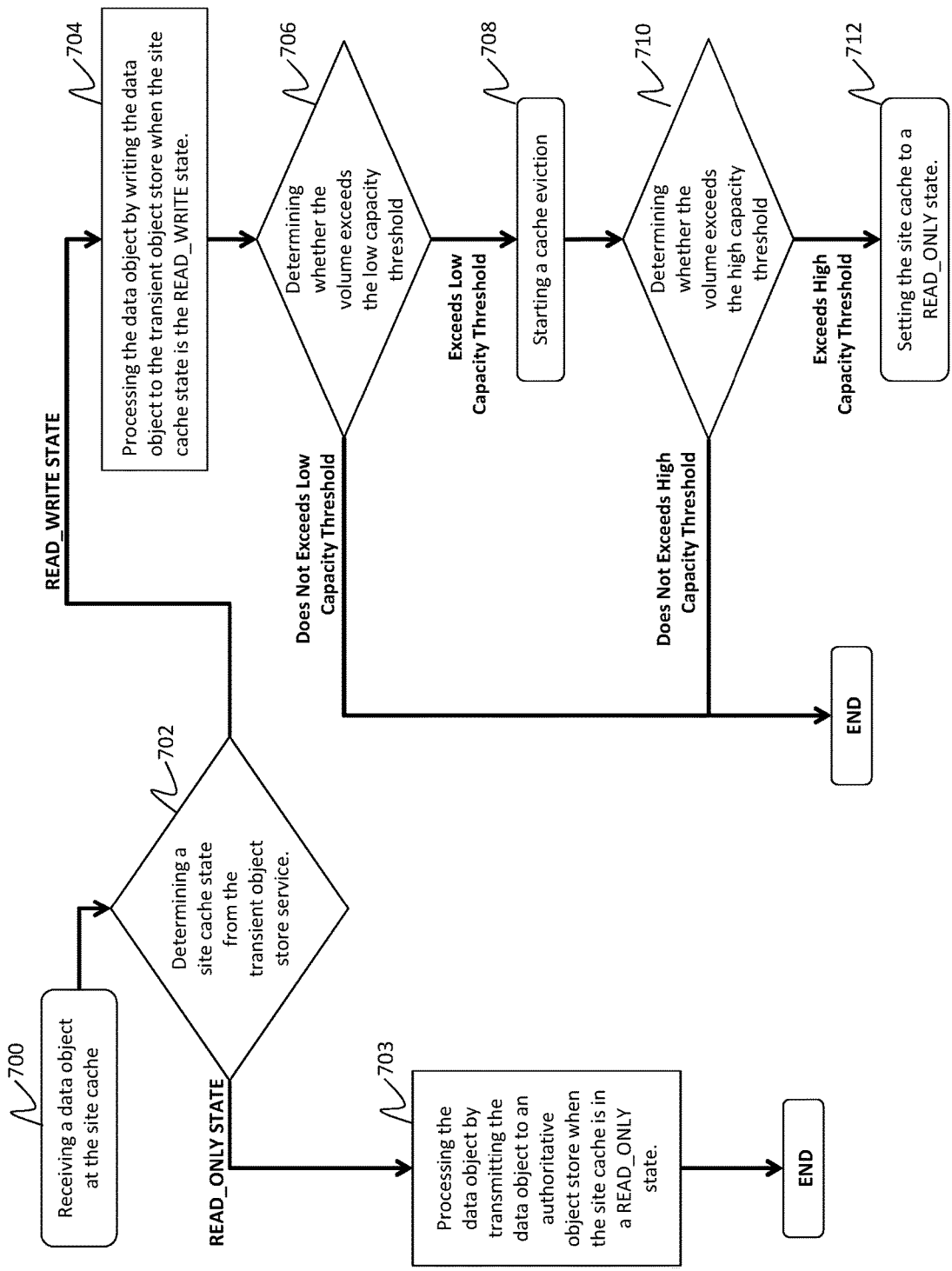
FIG. 7 depicts a process for managing a site cache's state consistent with an embodiment of the present disclosure.

Turning now to FIG. 7, a process for managing a site cache's state based on the volume of stored data on the transient object store, a high capacity threshold, and a low capacity threshold is discussed.

At block 700, a data object is received at the site cache. The data object could be, for example, received from a traffic processing engine. In an embodiment, the data object is received from a client attempting to write the data object to a distributed file system. Additionally or alternatively, the data object may be received from an authoritative object store as part of a client's read request. These and other embodiments are discussed in further detail above.

At block 702, a transient object store service determines if a site cache is in READ_ONLY or READ_WRITE state. As noted in reference FIG. 6, the state of the site cache may be based on the volume of data in relation to a high and/or low threshold. If the volume of stored data previously exceeded the high capacity threshold, and has not yet dropped below the low capacity threshold, then the site cache is in a READ_ONLY state. Otherwise the site cache is in a READ_WRITE state. In some embodiments the site cache's current state is stored in a metadata store. A transient object store service may query that store at block 702 to determine the state.

At block 703, the transient object store service, having determined in block 702 that the site cache is in READ_ONLY state, processes the data object by transmitting directly to an authoritative object store. This could occur, for example, between positions 610 and 612 of FIG. 6. Once the data object is stored the site cache may transmit a confirmation to a client and/or the process may terminate.

If the check at 702 determines the site cache is in a READ_WRITE state, the process may continue to block 704. At block 704 the data object may be written to the transient object store of the site cache. This could occur, for example, at position 602 and/or 606 of FIG. 6.

At block 706 the transient object store service may determine whether the volume of stored data on a site cache exceeds the low capacity threshold. This volume change may be the result of writing the data object at block 704. If the volume of stored data exceeds the low capacity threshold, such as if the volume after the write is at position 606 of FIG. 6, the process may continue to block 708. If the volume of stored data is below the low capacity threshold then the transient object store service does not change the state of the site cache and the process may terminate.

At block 708, after the transient object store service has determined that the volume of stored data exceeds the low capacity threshold, the site cache begins cache eviction based on the transient object store service's cache eviction policy. The cache eviction policy could be a First in First out ("FIFO"), a Least Recently Used ("LRU"), or a Largest out First ("LOF") policy, as noted above.

At block 710, the transient object store service may determine if the volume of stored data exceeds the high capacity threshold. This could occur, for example, at position 610 of FIG. 6. If the volume of stored data exceeds the high capacity threshold then the process may continue to block 712. Alternatively, if the volume of stored data is below the high capacity threshold then the process may terminate.

Finally, at block 712, the transient object store service sets the site cache to a READ_ONLY state in response to determining that the volume of stored data exceeds the high capacity threshold.

Figure 8:
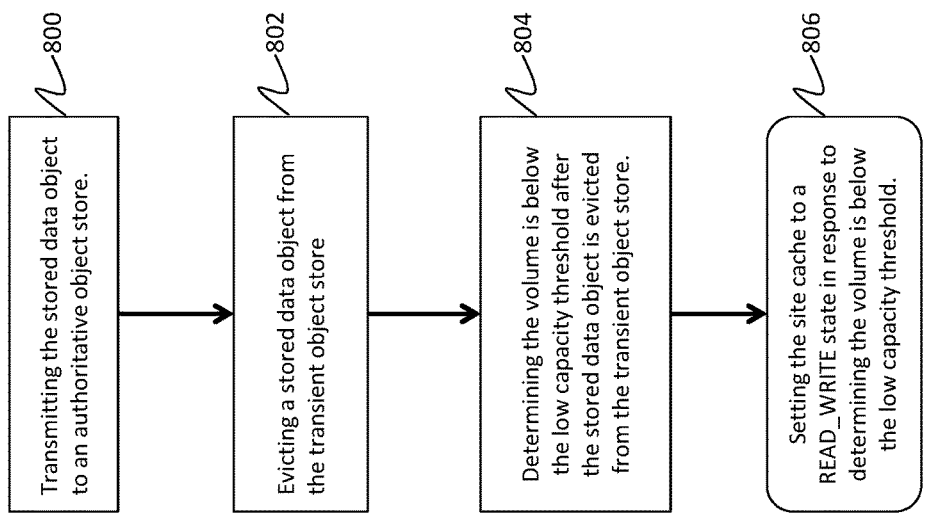
FIG. 8 depicts an eviction process consistent with an embodiment of the present disclosure.

Turning now to FIG. 8, an eviction process is discussed. This eviction process may move data objects from the transient object store and/or site cache to an authoritative object store. In some embodiments, the site cache state changes after eviction. This process could occur, for example, between positions 604 and 612 of FIG. 6. Additionally, it may occur in parallel with the process of FIG. 7.

At block 800, stored data objects are transmitted to the authoritative object store. For example, the data object may be transmitted using an HTTP PUT or POST. In some embodiments, transmitting the data object from the site cache to the authoritative object store may be substantially similar to writing the data object directly from a client to the authoritative object store. Data objects may be transmitted continuously to the authoritative object store, and in an embodiment are based on available egress bandwidth, a defined policy (e.g. FIFO, LRU, LOF, etc), and/or a defined schedule.

At block 802, a stored data object may be evicted from the transient object store. In some embodiments, evicting a data object comprises deleting the instance of the data object from the transient object store, removing its reference from the site cache metadata store, and/or updating the distributed file system's MDS to identify the objects new location. This eviction process could occur, for example, in parallel with block 800.

At block 804, the transient object store service determines if the volume of stored data is below the low capacity threshold. For example, the check may determine if the volume is at position 612 of FIG. 6. In some embodiments, this check may only occur if the site cache state is READ_ONLY. For example, the check will not occur if the volume is between positions 604 and 610, but will occur if the volume is between 610 and 612. If the volume is below the low capacity threshold and the state is READ_ONLY, the process may continue to block 806. Otherwise the eviction process may terminate.

At block 806, the transient object store service sets the site cache to a READ_WRITE state. The volume has returned to a place where the transient object store may service new data objects, which may be represented by the remainder of curve 600 after position 612.

Figure 9:
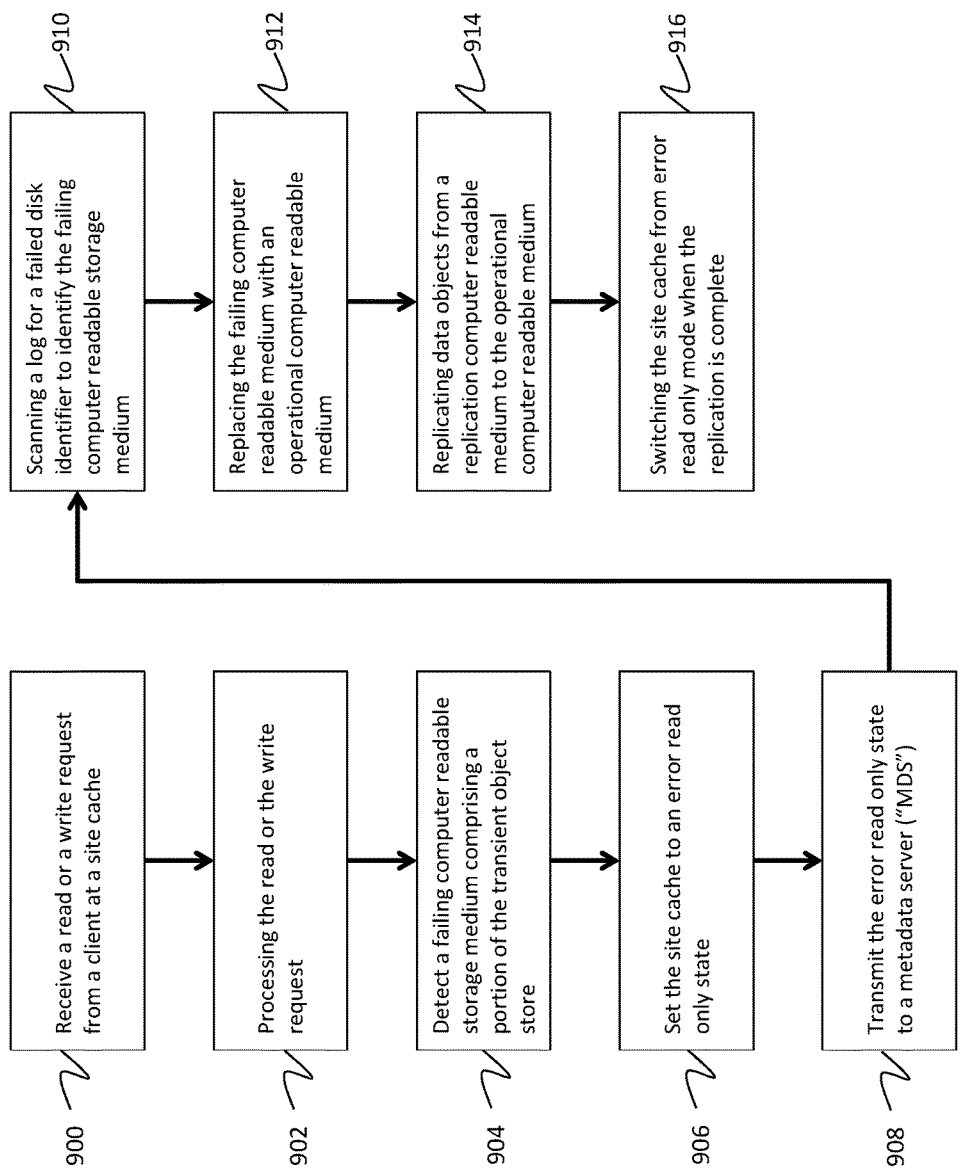
FIG. 9 depicts a process for repairing a site cache consistent with an embodiment of the present disclosure.

Turning now to FIG. 9, a process is discussed for repairing a site cache in the event of device failure. In some embodiments, the site cache and/or transient object store discussed herein may include a plurality of computer readable storage devices. These storage devices could include, for example, solid state drives or hard drives. In some embodiments, data objects written to the site cache may be replicated across multiple devices to protect against data loss. For example, a data object may be written to two storage devices during a write process, such as that discussed in FIG. 5. If a device containing the data object should fail, such as in the event of a hardware error, the data object may still be retrieved from the second device. FIG. 9 addresses repairing the site cache in the event of such a failure.

At block 900, either a read or a write request may be received at a site cache from a client. These read and write requests may be similar to those discussed above in reference to FIG. 4 and FIG. 5, and the site cache may attempt to service the read or write request accordingly.

At block 902, the site cache may attempt to process the read or the write request as discussed above. For example, if the request is a write request and the site cache is in a READ_WRITE state, the site cache may process the write request by writing it to a computer readable storage medium. Similarly, if the request is a read request, the site cache may attempt to read the data object from the computer readable storage medium.

At block 904, an error may be detected. This error may be, for example, detected while processing the read or write request in block 902. In some embodiments, the error may result from a failing storage device within the site cache. This storage device may comprise a portion of the transient object store, and may contain instances of data objects within the store. For example, the transient object store may include 30 TB of capacity from 10, 3 TB disks. Data objects may be stored across all 10 disks, and in some instances may be replicated between two or more disks. A disk may fail while it is being written to or read from. This failure may result in a read/write error, which may be detected at block 904.

In some embodiments, the read and/or the write operation may complete despite the error detected at block 902. For example, if the request is a read request and the data object is replicated across multiple devices, the data object will be read from a replica device rather than the failing device. Similarly, if the request is a write request, the data object may be written to storage devices other than the failing device. Additionally or alternatively, the request may be transmitted to an authoritative object store and/or a different site cache in the event of an error. This enables the system to service the request despite the faulty storage device.

At block 906, the site cache may be set to an ERROR_READ_ONLY mode and/or state. ERROR_READ_ONLY mode may be a universal state that supersedes all other states. For example, if the site cache is in a READ_ONLY or READ_WRITE state, ERROR_READ_ONLY mode will take priority. While in ERROR_READ_ONLY mode, the site cache may not service write requests. Rather, these requests may be transmitted through the site cache to the authoritative object store. The site cache may, however, service read requests. Servicing read requests may be important if data objects on the site cache have not yet been flushed to the authoritative object store.

At block 908, the ERROR_READ_ONLY state may be transmitted to the MDS. Additionally or alternatively, the state may be transmitted to a management tool notifying an administrator of the problem. While the site cache is in an ERROR_READ_ONLY state, the MDS may instruct clients to make read and write requests to the authoritative object store. When a client contacts the MDS for a URL, that MDS may return a location for both the site cache and the authoritative object store. The client may pass the URL for the authoritative object store to the site cache when making the request, thereby enabling the authoritative store to service the request when possible.

At 910, before, during, or after the site cache/transient object store's state is set to ERROR_READ_ONLY, log files may be scanned to identify the failing storage medium. In some embodiments, a computer process may scan the log for specific information. This information may be related to the error, and may enable an administrator to identify a specific failing hardware device.

Once a failing device is identified, it may be replaced with an operational device at block 912. Replacing the failing device with an operational device may involve physically unplugging the failing device from the system and replacing it with the operational device.

At block 914, data objects may be replicated from a replication device to the operational device. In some embodiments, the replication device may be another storage device in the site cache that contains a replicated copy of a data object stored on the failing device. Replicating the data object from the replication device to the operational device enables the system to maintain redundancy, even after the failing device is removed. This may be beneficial if another device, such as the replication device, fails in the future.

In some embodiments, a replication process manages data object replication. This process may identify data objects that were stored on the failed device, and replicate them to the operational device. For example, the replication process may query a metadata store, such as metadata store 314, to identify the data objects. These objects may then be transmitted from the replication device to the operational device. A site cache management process, such as transient object store service 310, may periodically poll the replication process to determine if the replication is complete. If no object has been replicated within the poll interval, the management process may determine replication is complete. Additionally or alternatively, the replication process may notify the management process when it has finished replicating the objects.

In some embodiments, the lost data object may be replicated to other devices in the system rather than the operational device. For example, as soon as an error is detected at block 904 the replication process may begin replicating the data objects to other devices in the system. Once the operational device is added, the replication process may replicate data objects to the device and remove the replicas from others. This may load balance the data objects across multiple devices in the system. As a result, the data objects on the operational device may not be the same as the data objects on the failing device.

Finally, at block 916, the site cache may be switched from ERROR_READ_ONLY to a different state. For example, the site cache may be switched to a READ_ONLY or a READ_WRITE state. In some embodiments, the switched state may be dependent on the site cache capacity, as discussed at least in reference to FIG. 6 and FIG. 7. In some embodiments, the state may be the same state the site cache was in when the error was detected. Alternatively, the state may be a different state than when the error was first detected. Switching the site cache state could involve, for example, transmitting the new state to the MDS.

Figure 10:
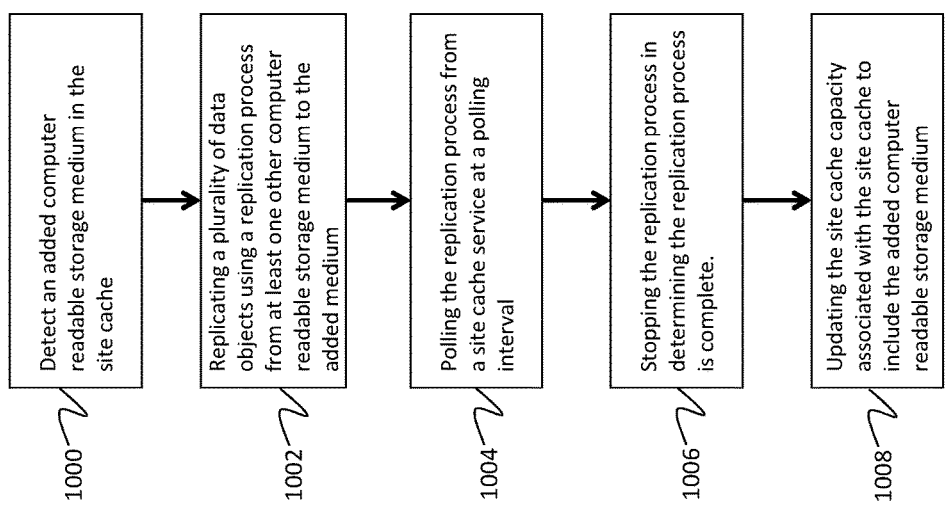
FIG. 10 depicts a process for growing a site cache consistent with an embodiment of the present disclosure

Turning now to FIG. 10, a process is discussed for a controlled increase of site cache capacity. As discussed above, a site cache may be physically located near a client system accessing the distributed file system. As the number of clients accessing the site cache increases, such as when a branch office of an organization adds additional employees, it may be beneficial to increase the site cache size to accommodate the additional workloads. While adding a new storage device may increase the capacity, it may be preferable to also replicate data objects to that new device for disaster recovery and improved performance. For example, if all the storage devices in the site cache are full and a new device is added, new data objects may be stored on that device but not replicated because the existing devices do not have available capacity. Similarly, if all the new writes are targeted at the added device, that device may be burdened while the existing devices are dormant. The process of FIG. 10 enables a site cache's capacity to be increased while still maintaining redundancy and system performance.

At block 1000, the site cache may detect that a computer readable storage medium that has been added to the system. In some embodiments, an administrator may identify the computer readable storage medium. Additionally or alternatively, the medium may be physically or virtually added to the site cache and a plug-and-play process may identify the additional device. Similarly, the entire site cache and/or the transient object store within the site cache may be shut down, the device may be added, and the device may be detected as the site cache and/or transient object store is brought back online. The new storage medium could be detected, for example, by a transient object store service.

At block 1002, a replication process may replicate a plurality of data objects from one storage device in the system to the added device. For example, the site cache may include two storage devices in addition to the added device. In an embodiment, one or both of these devices may be at or near capacity. When the new device is added, the replication process may start moving data objects from these two devices to the added device. In an embodiment, the replication process may communicate with a MDS or local metadata store to ensure the same object is not moved from both of the existing devices. This may maintain the object's replica in the system and prevent the replication process from storing the same object twice on the added device. Once a data object is stored on the added device, MDS and/or a local metadata store may be updated with the new location. The data object may then be removed from the previous device. As a result, the data objects existing in the site cache may be load balanced across the existing devices and the added storage medium.

At block 1004, the replication process may be polled at a specified polling interval. For example, a transient object store service may poll the replication process. When polled, the replication process may return the number of data objects replicated during the previous polling interval. This enables the site cache service to maintain visibility into where the data objects are moving in the system. If the replication process returns the number zero or a false Boolean value in response to a poll, the site cache service may determine that replication is complete. If the replication process returns a number greater than zero or a true Boolean value, the service may determine that replication is still in progress.

At block 1006, the replication process may be stopped or terminated. This could be in response to determining the process is complete. For example, the replication process may be stopped when it returns a zero in response to a poll. This may indicate that no data objects were replicated during the previous polling interval. As a result, the storage devices in the site cache may be properly load balanced.

Finally, at block 1008, the capacity associated with the site cache may be updated. This capacity may be within the site cache service, a local metadata store, an MDS, and/or a remote management application. Updating the capacity indicates that the added device is available and capable of servicing writes from clients. Prior to updating the site cache capacity, all of the write requests may be directed to existing drives.

Figure 11:
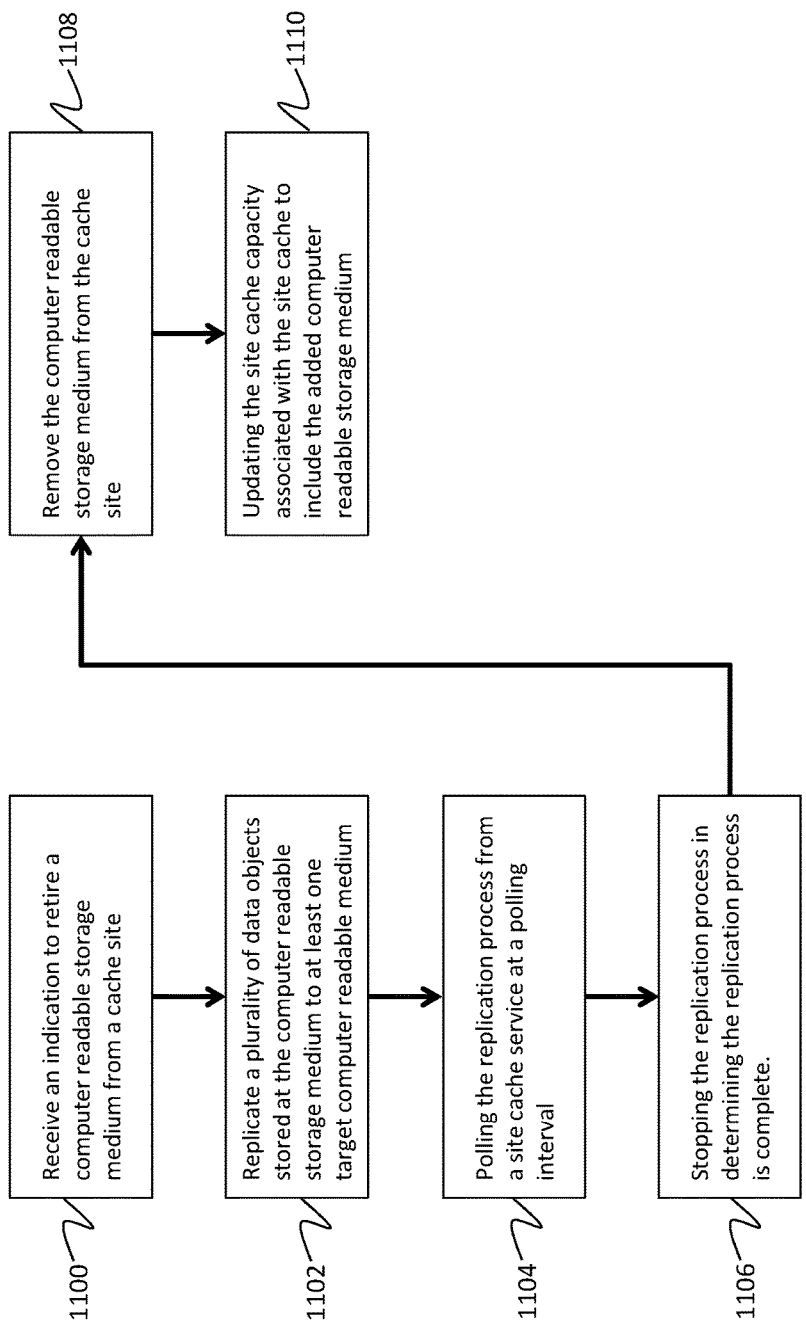
FIG. 11 depicts a process for shrinking a site cache consistent with an embodiment of the present disclosure.

While adding capacity to the site cache may be beneficial to accommodate increased loads, a site cache capacity may also need to be decreased. This could be, for example, in anticipation of a failing storage device. Additionally or alternatively, the size may be reduced to make room for a new storage device. For example, a physical system may not have enough bays to accommodate a new storage device, so an old one may be removed to make room. The site cache size could also be reduced to make room for higher performance drives, or to reallocate existing hardware to other devices. FIG. 11 discusses a process for reducing the size of a site cache in a controlled manner.

At block 1100, an indication may be received to retire a computer readable storage medium from a site cache. This indication could be received, for example, from an administrator. In an embodiment, the indication includes an identifier for the device to be removed from the cache.

At block 1102, a replication process may begin to move data objects stored on the identified computer readable medium to one or more target computer readable mediums within the site cache. This replication process may help ensure that when the device is removed the data stored within it is not lost. In some embodiments, the replication process may be substantially similar to that discussed in reference to FIG. 9 and FIG. 10.

As the replication process moves data objects around the system, it may update a local metadata store and/or and MDS. This may enable the site cache to track the data objects as they are moved and replicated to service future read requests and/or site cache flushes. In some embodiments, updating the local metadata store and/or MDS may be substantially similar to tracking a data object during a write process.

In some embodiments, the data objects are replicated from the identified storage medium to the target device(s) before the medium is actually removed. These data objects could, for example, be moved directly from the identified medium itself. Alternatively, they could be moved from a different device in the site cache that contains a replica of the data object. Moving the data objects directly from the device may enable the replication process to occur gradually, and may be helpful if the identified storage medium does not need to be replaced immediately. In some embodiments, the replication process may be polled periodically, as discussed above, to determine when it is complete. Once the replication process is finished, the identified device may be safely removed from the system at block 1108.

Additionally or alternatively, the replication process may occur after the identified device is removed from the site cache. For example, the indication received at block 1100 may comprise an alert that the device has been physically or virtually "yanked" (i.e. removed) from the site cache without prior warning. In such an embodiment, the replication process may engage and begin replicating the data objects stored on the yanked device from other storage mediums in the system. For example, the data object may have replicas on other devices. The replication process may use those replicas to create duplicates of the data objects on different devices within the site cache, thereby maintaining redundancy.

At block 1104, the replication process may be polled at a polling interval to determine its progress. This polling process may be substantially similar to that discussed above in reference to FIG. 10. For example, if no data objects were transmitted during the previous polling interval, the replication process may be determined to be complete.

At block 1106, the replication process may terminate when it is determined to be complete. For example, if no data objects were replicated during the previous polling interval, as discussed above, the replication may be terminated.

At block 1108, the identified computer readable storage medium may be removed from the system. Alternatively, the medium may have been removed before and/or during the replication process, and the data object may have been replicated from a redundant copy.

Finally, at block 1110, the site cache capacity may be updated in a similar manner to block 1008. For example, a registered site cache may be decreased to reflect the new capacity.

In some embodiments, the site cache may continue to service client read and/or write requests while it is being resized. For example, if a write request is received while a storage medium is being removed, the data object embodied in that request may be written to a different medium within the site cache. Similarly, new writes may be made to a new medium added to the system, even if a replication process is currently load balancing objects to that medium. Read requests may be processed from any device containing a copy of the requested data object.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for repairing a site cache, the method comprising:
   detecting a failing computer readable storage medium comprising a portion of a transient object store;
   setting a site cache associated with the transient object store to an error read only state in which the site cache does not service write requests, wherein the error read only state supersedes a read only state of the site cache and supersedes a read write state of the site cache;
   after the site cache has been set to the error read only state, replacing the failing computer readable storage medium with an operational computer readable storage medium; and
   changing the site cache from the error read only state.

2. The method of claim 1, further comprising:
   receiving a write request at the site cache from a client while the site cache is in the error read only state; and
   transmitting the write request from the site cache to an authoritative object store without processing the write request on the site cache.

3. The method of claim 1, further comprising transmitting the error read only state from the site cache to a metadata server ("MDS"), wherein the MDS is associated with the site cache.

4. The method of claim 1, further comprising:
   receiving a read request or a write request at the site cache from a client; and
   detecting the failing computer readable storage medium while processing the read request or the write request on the site cache.

5. The method of claim 4, further comprising scanning a log for a failed disk identifier in response to detecting the failing computer readable storage medium.

6. The method of claim 1, further comprising replicating data objects from a replication computer readable storage medium to the operational computer readable storage medium.

7. The method of claim 6, wherein the data objects were stored on the failing computer readable storage medium.

8. The method of claim 6, further comprising determining the data objects are replicated to the operational computer readable storage medium prior to changing the site cache from the error read only state.

9. A system for repairing a site cache in a distributed file system ("DFS"), the system comprising a non-transitory computer readable storage medium and a processor configured to execute instructions for:
   detecting a failing computer readable storage medium comprising a portion of a transient object store;
   setting a site cache associated with the transient object store to an error read only state in which the site cache does not service write requests, wherein the error read only state supersedes a read only state of the site cache and supersedes a read write state of the site cache;

after the site cache has been set to the error read only state, replacing the failing computer readable storage medium with an operational computer readable storage medium; and changing the site cache from the error read only state.

10. The system of claim 9, further comprising replicating data objects from a replication computer readable storage medium to the operational computer readable storage medium.

11. The system of claim 10, wherein the data objects were stored on the failing computer readable storage medium.

12. The system of claim 10, further comprising determining the data objects are replicated to the operational computer readable storage medium prior to changing the site cache from the error read only state.

13. A non-transitory computer readable storage medium comprising processor instructions for repairing a site cache in a distributed file system ("DFS"), instructions comprising:

detecting a failing computer readable storage medium comprising a portion of a transient object store;

setting a site cache associated with the transient object store to an error read only state in which the site cache does not service write requests, wherein the error read only state supersedes a read only state of the site cache and supersedes a read write state of the site cache;

after the site cache has been set to the error read only state, replacing the failing computer readable storage medium with an operational computer readable storage medium; and changing the site cache from the error read only state.

14. The non-transitory computer readable storage medium of claim 13, further comprising replicating data objects from a replication computer readable storage medium to the operational computer readable storage medium.

15. The non-transitory computer readable storage medium of claim 14, wherein the data objects were stored on the failing computer readable storage medium.

16. The non-transitory computer readable storage medium of claim 14, further comprising determining the data objects are replicated to the operational computer readable storage medium prior to changing the site cache from the error read only state.

17. The non-transitory computer readable storage medium of claim 13, wherein the instructions further comprise receiving one or both of a read request or write request, and completing the requested operation or operations notwithstanding the detection of the failing computer readable storage medium.

18. The non-transitory computer readable storage medium of claim 13, wherein changing the site cache from the error read only state comprises changing the site cache to a read-only state, or to a read-write state.

* * * * *